Dec. 1, 1959 E. FOUQUET 2,914,892
PROCESS AND ARRANGEMENTS FOR SIMULTANEOUS LUBRICATION AND
COOLING OF THE PIECE OF WORK AND THE CUTTING
TOOLS DURING MACHINING OPERATIONS
Filed Dec. 18, 1957 3 Sheets-Sheet 1

INVENTOR.
EUGENE FOUQUET
BY Richards Geier
ATTORNEYS

Dec. 1, 1959 E. FOUQUET 2,914,892
PROCESS AND ARRANGEMENTS FOR SIMULTANEOUS LUBRICATION AND
COOLING OF THE PIECE OF WORK AND THE CUTTING
TOOLS DURING MACHINING OPERATIONS
Filed Dec. 18, 1957 3 Sheets-Sheet 2
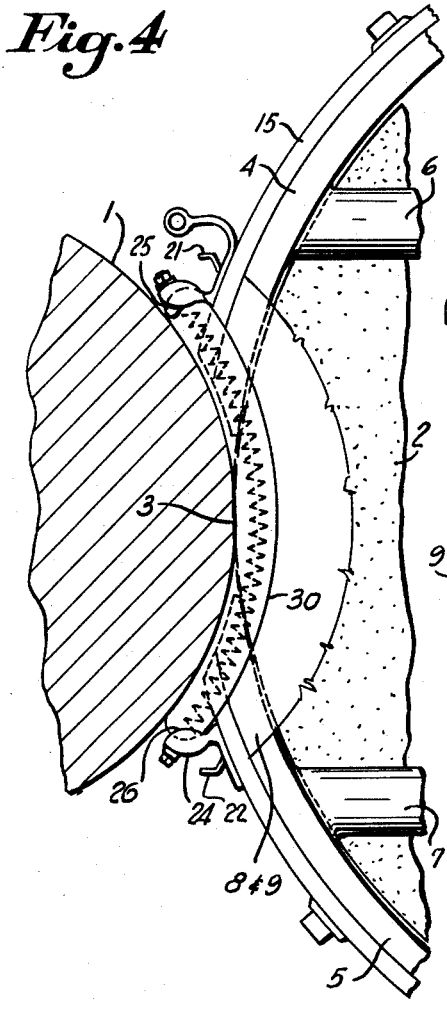
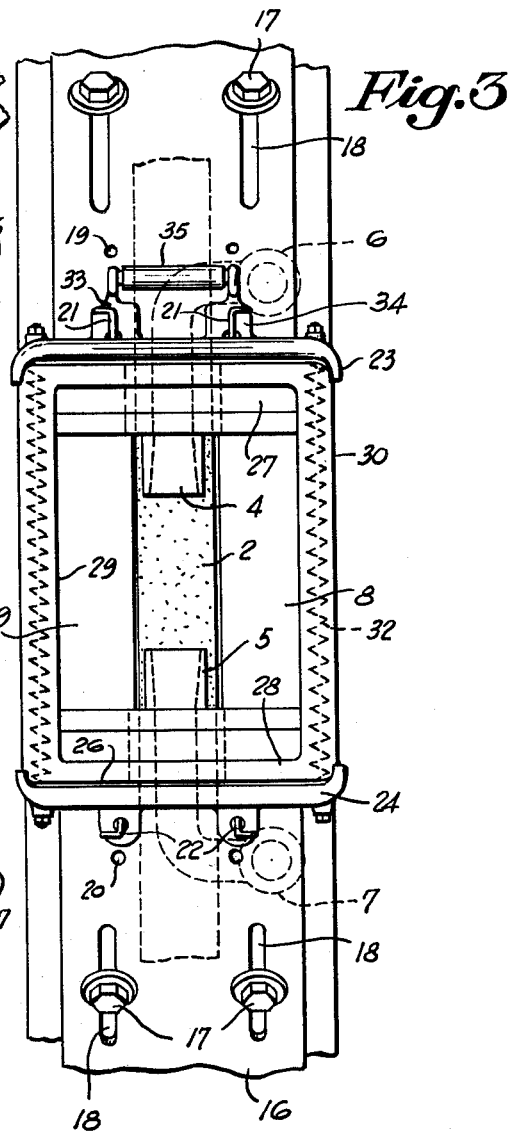
INVENTOR.
EUGENE FOUQUET
BY Richards & Geier
ATTORNEYS

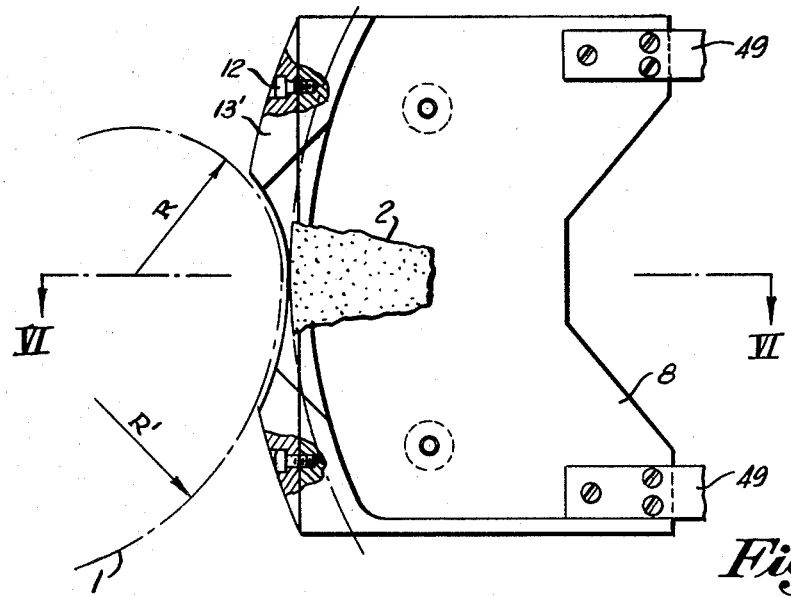
Fig. 5a
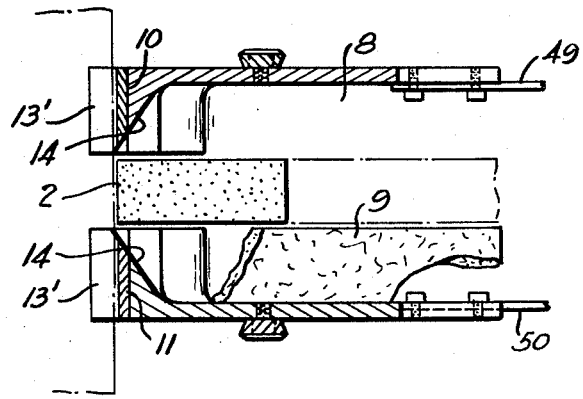
Fig. 5b
Fig. 6
INVENTOR.
EUGENE FOUQUET
BY Richards Geier
ATTORNEYS

United States Patent Office 2,914,892
Patented Dec. 1, 1959

2,914,892

PROCESS AND ARRANGEMENTS FOR SIMULTANEOUS LUBRICATION AND COOLING OF THE PIECE OF WORK AND THE CUTTING TOOLS DURING MACHINING OPERATIONS

Eugene Fouquet, Bois-Colombes, France

Application December 18, 1957, Serial No. 703,638

Claims priority, application France December 28, 1956

10 Claims. (Cl. 51—267)

In machining operations involving cutting tools it is usual to provide for suitable lubrication and cooling of the edge tools as well as the piece of work within the region where the cutting takes place. This current practice is applied mainly for the triple purpose of keeping the temperature below a critical value with a view to avoiding detrimental modification of the texture of the piece to be worked as well as of the tool, promoting smooth cutting and carrying off the metal particles, and eventually the grindstone dust, in order to reduce the tendency of the tool to be encrusted with said particles.

Such lubrication and refrigeration are generally obtained by means of one or more jets of a suitable liquid directed upon the cutting zone.

In applying this traditional process provisions are generally limited to judiciously choosing an adequate lubricant, determining the cross section and the power of the liquid jet, and carefully directing the latter upon the middle of the cutting region.

It has however been established, that these conditions and the usual practice as referred to above are absolutely inadequate in all cases where metal pieces of considerable hardness are to be subjected to machining processes involving cutting at very high rates of removal of material, i.e., at very high cutting speeds, such as applies particularly to the operation called "mill-grinding" as disclosed, together with appropriate machines for carrying said operation into effect, in other applications of the applicant.

In fact, with the application of the process called "mill-grinding," in which the grinding tool is perpetually whetted by chipping small fragments off the abrasive grains projecting from its surface, said grinding means veritably constitutes an edge tool rotating at a very high speed while acting on the matter to be worked with a large number of minute cutting edges.

It has been found by the applicant that in the application of such a machining process, the quantity of matter removed from a metal of great hardness (of the order of 125 Brinell), could be as high as 1 kg. per minute.

In order to maintain, in such cases, the efficiency of said cutting elements and in order to remove a maximum amount of calories so as to considerably reduce heat transfer to the object to be machined, it is necessary, as has been established by the applicant, to concentrate the jets of lubricating and cooling liquid even more thoroughly towards the cutting zone and to considerably reduce the dispersion of said jets, and it has particularly been found of fundamental importance to ensure instantaneous flooding of the metal surface as it becomes exposed by the removal of a chip.

The present invention concerns a lubricating and cooling process, as well as the means whereby said process may be carried into effect, capable of satisfying the above conditions.

The process according to the invention essentially comprises projecting the liquid in a powerful jet converging towards the cutting zone within a relatively constricted enclosed area surrounding said cutting zone.

For industrial application, said process, according to the invention, may be applied most efficiently with the aid of special security and matching devices, whereby the arrangement according to the invention may, within predetermined limits, be adapted to the transverse dimensions of the piece to be machined.

Such security devices are provided adjacent the cutting zone as well as at the end of the transverse feed motion of the cutting tool.

The security device disposed adjacent the cutting zone characteristically comprises a frame made of pliable matter combined with suitably shaped deflecting means and with the lubricant delivery spouts, in such a way as to constitute a permanent enclosure surrounding the cutting zone and specifically adapted to the diameter of the piece of work to be machined.

The safety device associated with the end of the transverse feed motion of the cutting tool is characterized by a kind of supporting or prolongation means in the shape of a ring fragment comprising an outer annular portion made up by a bundle of superposed resilient strips and a subjacent rigid support, on which said resilient strips are tightened. This supporting or prolongation means, when the cutting tool approaches the end of its motion, so cooperates with the frame displaced together with the grindstone, as to ensure the continuity of the lubricating and cooling process thus enabling its application to the cutting zone during all the phases of the machining operation.

The devices for matching the arrangement in accordance with the diameter of the piece to be worked constitute an integral part of said security devices.

These as well as various other characteristics of the process as well as of the devices capable of carrying same into effect will be more clearly brought out in the detailed description given hereinafter with reference to the accompanying drawings, wherein:

Figure 3 is a front view of a frame arrangement such as may be used for carrying the process according to the invention into effect;

Figure 4 is a lateral elevation of the elements shown in Figure 3;

Figures 5a and 5b each represent a half lateral, part sectional elevation of a side screen cooperating in the formation of an enclosure surrounding the cutting zone, both said screens being united with devices adaptable to work pieces of different diameters;

Figure 6 is a section according to line VI—VI of Figure 5b.

Figure 1:
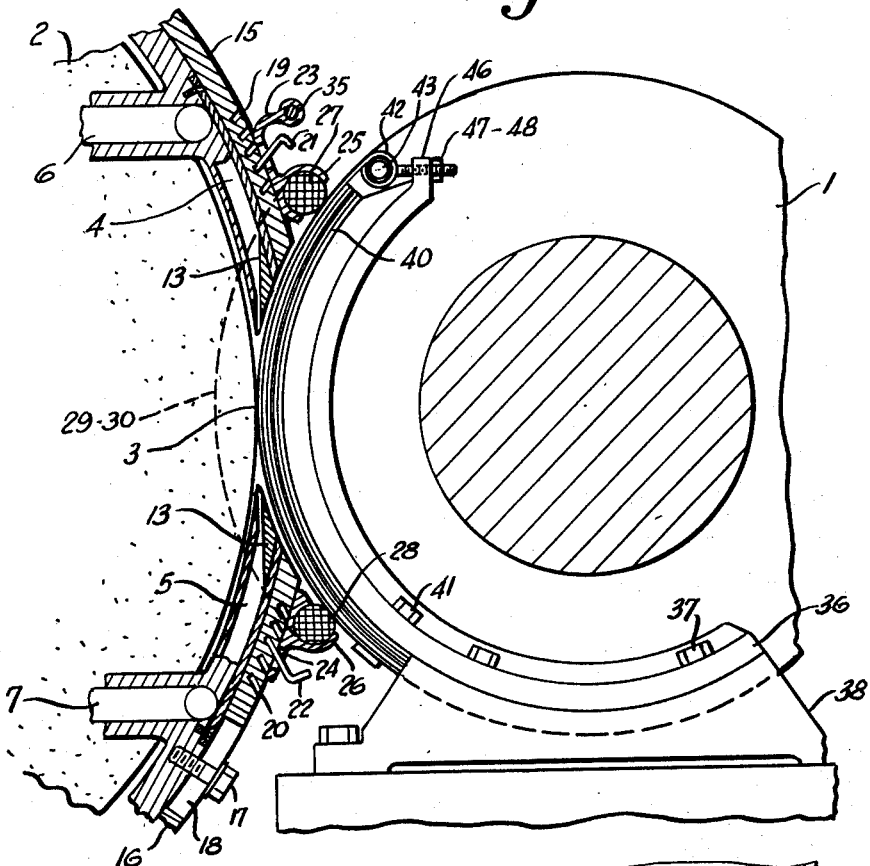
Figure 1 is a lateral part-sectional elevation of a device enabling the application of the process according to the invention.
Figure 2:
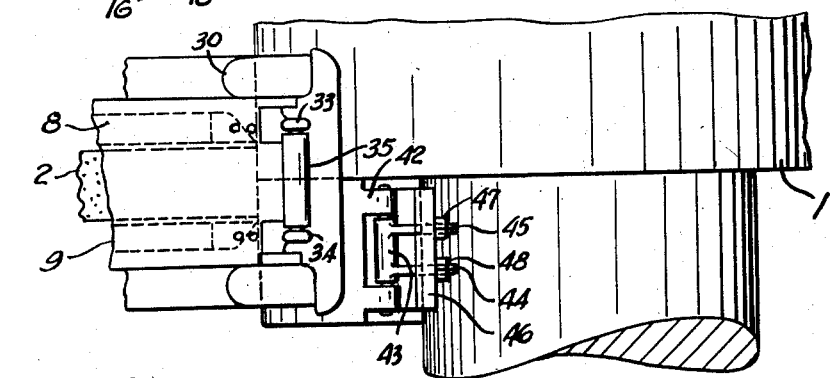
Figure 2 is a plan view of the same elements as represented in Figure 1.

In said figures 1 denotes the piece to be machined and 2 the grindstone. The latter is preferably of the kind called "mill-grinding stone," i.e. a grindstone, in which the abrasive grains projecting from its active surface are continuously subjected to a chipping operation so as to enable the grindstone at each revolution to act with a great number of sharp cutting edges on the piece to be machined.

On either side of the cutting zone, denoted by 3, is disposed a tubular spout, 4—5 respectively, both said tubular spouts having a slantingly edged opening shaped so as to enable said spouts to penetrate as far as possible towards said cutting zone. Extending into each of said spouts there is provided a conduit 6 and 7 respectively, for supplying the lubricating and cooling fluid. Said spouts are housed each in a hollow space enclosed by a side screen 8 and 9 respectively, the latter being limited at the front side, by a plane surface 10 and 11 respectively, whereon, by means of screws such as 12, may be adjusted or secured suitably shaped interchangeable insertion elements such as 13'—13", the latter being adjusted to the radius R, or R', as the case may be, of the piece 1 to be machined.

As shown particularly in Figure 6, such a side screen 8—9 respectively, is disposed on either side of the grindstone 2. Said side screens 8—9 have front side edges so shaped as to form deflecting elements, such as 14, disposed opposite and on either side of the mouth of the spouts 4—5. On the outer face of the spouts 4—5, curved plates, such as 15—16 respectively, are fixed by means of bolts such as 17 passing through elongated slots such as 18 and secured in extensions of said spouts, said plates being concentrically disposed with respect to the grindstone. Both said plates 15—16 are provided with a plurality of openings such as 19 and 20 respectively. On each of said plates 15—16, with the aid of pins such as 21—22, is secured a cross member, as indicated at 23 and 24 respectively, the longitudinal edge nearest to the axis of the piece being machined, of said cross member being formed with a cylindrical channel, 25 and 26 respectively.

Said channels each embrace and hold one of the short sides, 27, 28 respectively, of a frame made of ductile or pliable material, the long sides 29, 30 respectively, of which are reinforced by means of a helicoidally wound metal wire 31, 32 respectively. The resilient framework 27—28—29—30 thus formed and secured on the plates 15 and 16, closely fits the form of the corresponding part of the piece being worked and thus completes the enclosure of the cutting zone, as indicated diagrammatically at 3. The upper cross member 23 is provided with two small supports 33—34 joined by a link 35. On either side of the piece to be worked 1, are disposed supporting or prolongation means intended to maintain the enclosure as described above in an efficient working position throughout its axial motion along the length of the piece being worked, by preventing said enclosure from suddenly becoming inoperative, when the grindstone approaches the end of its transverse motion. With that end in view, said supporting or prolongation means comprises a rigid support 36 having the shape of a ring portion, disposed concentrically to the piece to be machined 1, said support being fixed, by means of screws 37, on a base 38 mounted on an appropriate carriage 39. Upon the free part of said rigid support 36 is mounted a stack of resilient strips 40 secured at one end on said rigid support 36, e.g. by means of a bolt 41, the outer strip 42 of said stack having a rod portion 43 fastened to its free end, said rod portion being provided with two parallel threaded rods 44—45 passing through the free end 46 of said fixed support 36 and secured thereto by means of nuts 47—48. In this way a tensioning device is obtained whereby the stack of springs 40 is tightly held in position.

With the aid of the enclosing arrangement and security devices as described above, the process according to the invention may readily be carried into effect, in the following way: after the interchangeable front side insertion pieces 13' or 13" have been determined to fit the radius, R or R' respectively, of the piece to be worked, said insertion pieces are mounted on the corresponding side screens 8—9 by means of screws 12.

The spouts 4—5 together with their supply pipes, 6—7 respectively, are applied to the working area of the grindstone 2 and inserted as deeply as possible into the nips between the piece of work 1 and the grindstone 2, so as to penetrate as far as possible towards the cutting zone 3. In this position said spouts are firmly secured on any solid supporting structure (not shown). Then on either side of the grindstone 2, the side screens 8—9 are fixed with the aid of laths or strips such as 49—50, so as to bring the ends of the front side insertion pieces, such as 13, right up to the corresponding part of the piece to be worked 1. On the outer face of the spouts 4—5 the plates 15—16 are fixed, the correct position of said plates being determined and ensured with the aid of the screws 17 passing through the elongated slots 18. In this way it is possible to reduce the distance between the piece to be worked and the corresponding ends of said plates 15—16 to the strict minimum. The latter are firmly secured in this position by means of said screws 17. Next, the lower cross member 24 of the pliable framing is correctly secured to the lower plate 16 by means of pins 22 inserted into suitably selected holes 20. By pulling at the link member 35 of the pliable framing 27—28—29—30 the latter is applied to the corresponding part of the piece to be worked 1, and in this position it is secured by means of pins 21 inserted into suitable holes 19 of the upper plate 15. In this way an enclosure is obtained which is closely adapted to the grindstone as well as to the piece to be worked. By this means it is ensured, that the powerful jets of lubricant and cooling liquid projected from the spouts 4—5 converge towards the cutting zone 3 and exert concentrated action thereon so as to fulfil all requirements of the process according to the invention, the deflecting elements 14 making a special contribution to this result.

Similarly the supporting or prolongation means for ensuring correct operation at both ends of the transverse feed motion, are prepared in advance, whereby the outer leaf of the stack of springs should be given a slightly smaller diameter than that of the piece to be machined 1, the difference being at least slightly bigger than the thickness of the metal layer to be removed from the entire surface of the piece 1, i.e. in such a way, that the grindstone 2 when approaching the end of its transverse motion may freely rotate in front of the supporting or prolongation means without touching the outer leaf 42 of the stack of springs, the latter being intended to act solely as a lateral prolongation of the supporting surface of the piece 1, so as to provide adequate support for the aforesaid pliable framework during the whole operation.

Evidently an enclosure such as has been described above could be realized in many different ways, inasmuch as many ways and means can be found for enclosing the cutting zone within a relatively constructed space delineated by rigid elements combined with pliable resilient elements.

The invention concerns the process as described hereinbefore, as well as all devices and arrangements enabling to carry said process into effect.

What I claim is:

1. Arrangement for simultaneous lubrication and cooling of objects subjected to a machining process involving the use of a grinding tool, comprising a plurality of pairs of opposing spouts disposed adjacent the working surface of the grinding tool and having outlet openings disposed closely to the zone where the grinding process takes place, side screens disposed on either side of said grinding tool and enclosing said tool as well as said spouts, deflecting means secured to said side screens and disposed facing said outlet openings, so as to deflect jets of lubricant and cooling fluid springing from said spouts to effectively reduce dispersion of said jets, and an enclosure of ductile material supported on the surface of the object to be worked.

2. Arrangement for simultaneous lubrication and cooling of objects subjected to a machining process involving the use of a grinding tool, comprising a plurality of pairs of opposing spouts disposed adjacent the working surface of the grinding tool and having outlet openings disposed closely to the zone where the grinding process takes place, side screens disposed on either side of said grinding tool and enclosing said tool as well as said spouts, deflecting means secured to said side screens and disposed facing said outlet openings, so as to deflect jets of lubricant and cooling fluid springing from said spouts to effectively reduce dispersion of said jets, and an enclosure of ductile material supported on the surface of the object to be worked, in which the enclosure of ductile material comprises a rectangular framing having an upper and a lower cross member and two lateral members, said upper and lower members being secured to rigid supports fixed on said spouts, said lateral members being stretched and applied to the surface of the object to be worked.

3. Arrangement as claimed in claim 2, in which said lateral members are reinforced by means of helicoidally wound metal wire and are strung over the surface of the object to be worked.

4. Arrangement as claimed in claim 2, in which said upper and lower cross members are secured to rigid supports adjustably mounted on subjacent carriers fixed to said spouts, said lateral members being reinforced by means of helicoidally wound metal wires and being tightened across the surface of the object to be worked.

5. Arrangement as claimed in claim 2, said arrangement further comprising curved plates having elongated slots formed therein, screws passing through said slots, said curved plates being adjustably secured by said screws on the upper faces of said spouts, and rigid supports adjustably mounted on said curved plates, said upper and lower cross members of said rectangular framing being secured to said rigid supports, said lateral members of said rectangular framing being reinforced by means of helicoidally wound metal wires and being stretched across the surface of the object to be worked.

6. Arrangement as claimed in claim 2, said arrangement further comprising curved plates adjustably secured to said spouts, said plates having a plurality of pairs of holes formed therein, rigid supporting means having a pair of lips with holes registering with any pair of said plurality of pairs of holes, said supporting means being adjustably mountable on said plates by means of pins passing through the holes of said lips and through any pair of subjacent holes in said plates, said rigid supporting means further comprising cylindrical channels, said upper and lower cross members of said rectangular framing being secured in said channels of said rigid supporting means, said lateral members of said rectangular framing being reinforced by means of helicoidally wound metal wires and being stretched across the surface of the object to be worked.

7. Arrangement as claimed in claim 2, said arrangement further comprising curved plates adjustably mounted on said spouts, a pair of rigid supporting means adjustably mountable on said plates and each having a pair of lips and a cylindrical channel, the upper cross member of said rectangular framing being secured in the cylindrical channel of one of said supporting means, the lower cross member of said rectangular framing being secured in the cylindrical channel of the other of said supporting means, the lips of said first supporting means being bent upward and joined by a link member, said link member being arranged so as to serve as a grip element enabling to exert an upward pull on the upper cross member of said framing with a view to stretching the lateral members of said framing across the surface of the object to be worked.

8. Arrangement for simultaneous lubrication and cooling of objects subjected to a machining process involving cutting operations, comprising a plurality of pairs of opposing spouts having outlet openings disposed closely to the zone where the processing takes place, lateral deflecting means disposed facing said outlet openings so as to deflect jets of lubricant and cooling fluid emerging from said spouts, an enclosure of ductile material supported on the surface of the object to be worked, prolongation structures disposed on either side of the object to be worked so as to ensure continuity of the supporting surface for said enclosure when the latter is transversely displaced beyond the limits of the piece to be worked, said prolongation structures being arranged to present a cylindrical surface with adjustable diameter so as to enable adapting said said surface to the adjacent surface of the object to be worked.

9. Arrangement as claimed in claim 8, in which the adjustable prolongation structures each comprise a supporting means of cylindrical shape coaxially disposed with respect to the object to be worked and having an outer diameter slightly smaller than that of the object to be worked.

10. Arrangement as claimed in claim 8, in which the adjustable prolongation structures each comprise a stack of resilient strips flexed and tightened on a rigid support of part annular shape, the number and thickness of said strips being such so as to provide a cylindrical outer surface having a diameter slightly smaller than that of the adjacent surface of the object to be worked.

References Cited in the file of this patent

UNITED STATES PATENTS

| | | |
|---|---|---|
| 385,666 | Hadley | July 3, 1888 |
| 1,416,475 | Knowles | May 16, 1922 |
| 1,765,890 | Vates | June 24, 1930 |
| 2,047,649 | Robinson | July 14, 1936 |
| 2,301,069 | Mulholland | Nov. 3, 1942 |
| 2,462,710 | Ballinger | Feb. 22, 1949 |
| 2,475,811 | Wagner et al. | July 12, 1949 |

FOREIGN PATENTS

| | | |
|---|---|---|
| 223,824 | Switzerland | Oct. 15, 1942 |